Patented Mar. 16, 1937

2,074,192

UNITED STATES PATENT OFFICE 2,074,192

HIGH MELTING POINT ROSIN AND METHOD FOR ITS PRODUCTION

Paul Schnorf, Wiesli, Switzerland, assignor to Hercules Powder Company, Wilmington, Del., a corporation of Delaware No Drawing. Application May 20, 1930, Serial No. 454,200. Renewed July 3, 1935

16 Claims. (Cl. 260—2)

My invention relates to a high melting point rosin and method for its production.

The method in accordance with my invention involves the treatment of wood or gum rosin, with reagents and under conditions to be hereinafter fully disclosed, whereby its melting point is raised and the treated rosin is rendered adaptable for many uses for which ordinary rosin is undesirable due to its relatively low melting point.

The rosin produced in accordance with the method embodying this invention will be found to have a melting point within about the range 85° C.–100° C. (drop method) as compared with a melting point within about the range 76° C.–79° C. (drop method) for untreated rosin. Generally the treated rosin will have a lower acid number than before treatment and while its color may be somewhat increased, it will not be black or tarlike, but will rather be reddish in color when viewed in small particles. The rosin product may, if desired, be partially distilled, at suitable temperature and pressure, for its separation into a soft rosin distillate and a hard rosin residue i. e. comprising mainly rosin and polymerized rosin respectively. The hard rosin residue will amount to about 25–75% of the product, depending upon the condition of treatment.

In accordance with my invention rosin, either wood or gum rosin, is subjected to treatment with a metallic chloride, preferably, though not necessarily, anhydrous, such, for example, as stannic chloride, aluminum chloride, zinc chloride, and the like, while at the same time the rosin is heated without, however, subjecting it to a temperature such that any large proportion of the rosin will be decomposed the metallic chloride acts catalytically to promote polymerization of the rosin.

In carrying the method embodying my invention into practice, the rosin to be treated is desirably melted, the metallic chloride added to it with agitation and the mixture then heated for say a period within about the range 0.5–10 hours, at a temperature within about the range 100° C.–200° C., with continued agitation to insure efficient contact between the rosin and the metallic chloride. If desired, the product which will have a melting point, on completion of the treatment indicated, higher than that of the rosin subjected to treatment, may be partially distilled for its separation into relatively hard and relatively soft portions. Where either type, from the standpoint of hardness, is desirable for any particular use, when the product is partially distilled such may desirably be effected at a bath temperature within about the range 250° C.–300° C. under a reduced pressure within about the range ¼–½ inch of mercury in order to avoid decomposition of the product.

As a more specific illustration of the practical adaptation of the method embodying this invention, for example, 150 grams of ordinary wood rosin, melting point 76° C.–79° C. (drop method) is melted, say at a temperature of about 125° C. and about 0.6 cc. of stannic chloride added with agitation. The rosin is then subjected to treatment with the stannic chloride for a period of about nine hours, the temperature being gradually raised to about 150° C. and the agitation being continued. On completion of the treatment the product will be found to have a melting point of about 93° C. (drop method), a somewhat lower acid number than the rosin treated and a reddish color. The product may be used where a high melting point is required, as for example, in varnishes, ester gums and synthetic resins, and the like. If desired the rosin may be subjected to treatment in solution in any suitable solvent, which will be inert in the treatment, as for example, gasoline, xylene, etc.

If desired, the product may be partially distilled, for example, up to a bath temperature of about 300° C. under a pressure of about ½ inch of mercury and under such conditions the product may be made to separate into a relatively soft distillate and a residue harder than and having, as has been indicated, a higher melting point than the original rosin.

I am aware of the United States Letters Patent No. 1,660,762, dated February 28, 1928, for Process for treating rosin, to Robert C. Palmer. However, it will be understood that according to that patent the rosin is treated at a temperature such that it will be decomposed for the production of rosin oil, while in accordance with the method embodying my invention herein disclosed decomposition of any large proportion of the rosin is avoided and the rosin is rather converted into a more complex compound by means of polymerization than broken down into simpler substance by decomposition.

It will be appreciated that no particular form of apparatus will be required in carrying out the method embodying my invention.

Further, it will be understood that I contemplate as within the scope of my invention the use of any metallic chloride operably equivalent for those herein specifically mentioned. Thus, by way of illustration, chlorides derived from a metal which has the capacity for forming an amphoteric hydroxide may be used, and it will be appreciated that a metallic bromide where operable, may be used equivalently for a metallic chloride.

What I claim and desire to protect by Letters Patent is:

1. The method of raising the melting point of rosin which includes treating rosin with a metallic chloride derived from a metal capable of forming an amphoteric hydroxide and with heat at a temperature below that at which any large proportion of the rosin will be decomposed but sufficient to effect polymerization in the presence of the metallic chloride, and fractionating the product to separate rosin from polymerized rosin.

2. The method of raising the melting point of rosin which includes treating rosin with an anhydrous metallic chloride derived from a metal capable of forming an amphoteric hydroxide and with heat at a temperature below that at which any large proportion of the rosin will be decomposed but sufficient to effect polymerization in the presence of the metallic chloride, and subjecting the product to partial distillation at a bath temperature within about the range 250° C.–300° C. to separate rosin from polymerized rosin.

3. The method of raising the melting point of rosin which includes treating rosin with stannic chloride and with heat at a temperature within about the range 100° C.–200° C. and subjecting the product to partial distillation under reduced pressure.

4. The method of raising the melting point of rosin which includes treating rosin with stannic chloride and with heat at a temperature within about the range 100° C.–200° C. and subjecting the product to partial distillation under a pressure of about ½" of mercury up to a bath temperature of about 300° C.

5. The method of raising the melting point of rosin which includes treating rosin with zinc chloride and with heat at a temperature within about the range 100° C.–200° C. and subjecting the product to partial distillation under reduced pressure.

6. The method of raising the melting point of rosin which includes treating rosin with zinc chloride and with heat at a temperature within about the range 100° C.–200° C. and subjecting the product to partial distillation under a pressure of about ½" of mercury up to a bath temperature of about 300° C.

7. The method of raising the melting point of rosin which includes treating rosin with aluminum chloride and with heat at a temperature within about the range 100° C.–200° C. and subjecting the product to partial distillation under reduced pressure.

8. The method of raising the melting point of rosin which includes treating rosin with aluminum chloride and with heat at a temperature within about the range 100° C.–200° C. and subjecting the product to partial distillation under a pressure of about ½" of mercury up to a bath temperature of about 300° C.

9. The method of raising the melting point of rosin which includes treating rosin with aluminum chloride and with heat at a temperature below that at which any large proportion of the rosin will be decomposed but sufficient to effect polymerization in the presence of aluminum chloride and fractionating the product to separate rosin from polymerized rosin.

10. The method of raising the melting point of rosin which includes treating rosin with zinc chloride and with heat at a temperature below that at which any large proportion of the rosin will be decomposed but sufficient to effect polymerization in the presence of zinc chloride and fractionating the product to separate rosin from polymerized rosin.

11. The method of raising the melting point of rosin which includes treating rosin with stannic chloride and with heat at a temperature below that at which any large proportion of the rosin will be decomposed but sufficient to effect polymerization in the presence of stannic chloride and fractionating the product to separate rosin from polymerized rosin.

12. The method of raising the melting point of rosin which includes treating rosin with a volatile, inorganic metallic chloride derived from a metal capable of forming an amphoteric hydroxide and with heat at a temperature below that at which any large proportion of the rosin will be decomposed but sufficient to effect polymerization in the presence of the metallic chloride and fractionating the product to separate rosin from polymerized rosin.

13. The method of raising the melting point of rosin which includes treating rosin with a volatile, inorganic metallic chloride derived from a metal capable of forming an amphoteric hydroxide and with heat at a temperature within about the range 100° C.–200° C. and fractionating the product to separate rosin from polymerized rosin.

14. The method of raising the melting point of rosin which includes treating rosin in solution in an inert solvent for the rosin with a volatile, inorganic metallic chloride derived from a metal capable of forming an amphoteric hydroxide and with heat at a temperature below that at which any large proportion of the rosin will be decomposed but sufficient to effect polymerization in the presence of the metallic chloride and fractionating the product to separate rosin from polymerized rosin.

15. A partially polymerized rosin characterized by a higher melting point than the rosin from which it is formed, said partially polymerized rosin being the residue left after fractional distillation under reduced pressure to remove the low end of the product formed by the treatment of rosin to effect polymerization thereof.

16. A partially polymerized rosin characterized by a higher melting point than the rosin from which it is formed and by the presence of traces of a metallic chloride, said partially polymerized rosin being the residue left after fractional distillation under reduced pressure to remove the low end of the product formed by heating rosin with a metallic chloride derived from a metal capable of forming an amphoteric hydroxide at a temperature below that at which any large proportion of the rosin will be decomposed, but sufficient to effect polymerization in the presence of the metallic chloride.

PAUL SCHNORF.